(12) United States Patent
Steeman et al.

(10) Patent No.: US 7,578,003 B2
(45) Date of Patent: Aug. 25, 2009

(54) BALLISTIC-RESISTANT ARTICLE

(75) Inventors: Reinard Jozef Maria Steeman, Elsloo (NL); Martinus Johannes Nicolaas Jacobs, Heerlen (NL)

(73) Assignee: DSM IP Assets B.V., Heerlen (NL)

( * ) Notice: Subject to any disclaimer, the term of this patent is extended or adjusted under 35 U.S.C. 154(b) by 74 days.

(21) Appl. No.: 10/584,754

(22) PCT Filed: Jan. 1, 2004

(86) PCT No.: PCT/NL2004/000028

§ 371 (c)(1),
(2), (4) Date: Sep. 8, 2006

(87) PCT Pub. No.: WO2005/066577

PCT Pub. Date: Jul. 21, 2005

(65) Prior Publication Data

US 2007/0163023 A1 Jul. 19, 2007

(51) Int. Cl.
*F41H 1/02* (2006.01)
*F41H 5/04* (2006.01)
*F41H 13/00* (2006.01)

(52) U.S. Cl. ............................................................ 2/2.5
(58) Field of Classification Search ................. 2/2.5
See application file for complete search history.

(56) References Cited

U.S. PATENT DOCUMENTS

| | | | | |
|---|---|---|---|---|
| 4,613,535 | A * | 9/1986 | Harpell et al. | 428/113 |
| 4,921,906 | A * | 5/1990 | Meyer et al. | 525/53 |
| 5,183,701 | A * | 2/1993 | Jacobs et al. | 442/118 |
| 6,740,708 | B2 * | 5/2004 | Bruls et al. | 525/66 |
| 6,743,832 | B2 * | 6/2004 | Van Dijk et al. | 523/137 |
| 6,797,379 | B2 * | 9/2004 | Van Dijk et al. | 428/401 |
| 6,818,678 | B2 * | 11/2004 | Yamaguchi et al. | 522/35 |
| 6,878,225 | B2 * | 4/2005 | Moreira et al. | 156/229 |
| 6,893,704 | B1 * | 5/2005 | van der Loo | 428/107 |
| 6,916,533 | B2 * | 7/2005 | Simmelink et al. | 428/364 |
| 6,931,662 | B2 * | 8/2005 | Lindemulder | 2/2.5 |
| 7,114,186 | B2 * | 10/2006 | Steeghs et al. | 2/2.5 |

(Continued)

FOREIGN PATENT DOCUMENTS

EP 311197 A2 * 4/1989

(Continued)

OTHER PUBLICATIONS

International Search Report.

*Primary Examiner*—Bobby H Muromoto, Jr.
(74) *Attorney, Agent, or Firm*—Nixon & Vanderhye P.C.

(57) ABSTRACT

A preformed sheet is provided with at least two mono-layers, each mono-layer containing unidirectionally oriented fibers having a tensile strength of at least about 1.2 GPa and a tensile modulus of at least 40 GPa, and a binder, with a fiber direction in each mono-layer being rotated with respect to the fiber direction in an adjacent mono-layer. A separating film is provided on both outer surfaces, the separating film having a porosity of between 40 and 90%. Assemblies and articles with such preformed sheet offer a substantially higher ballistic protection level at a certain weight. An assembly of at least two such sheets and a flexible ballistic-resistant article which includes such an assembly are also provided.

11 Claims, 1 Drawing Sheet

U.S. PATENT DOCUMENTS

Figure 1:
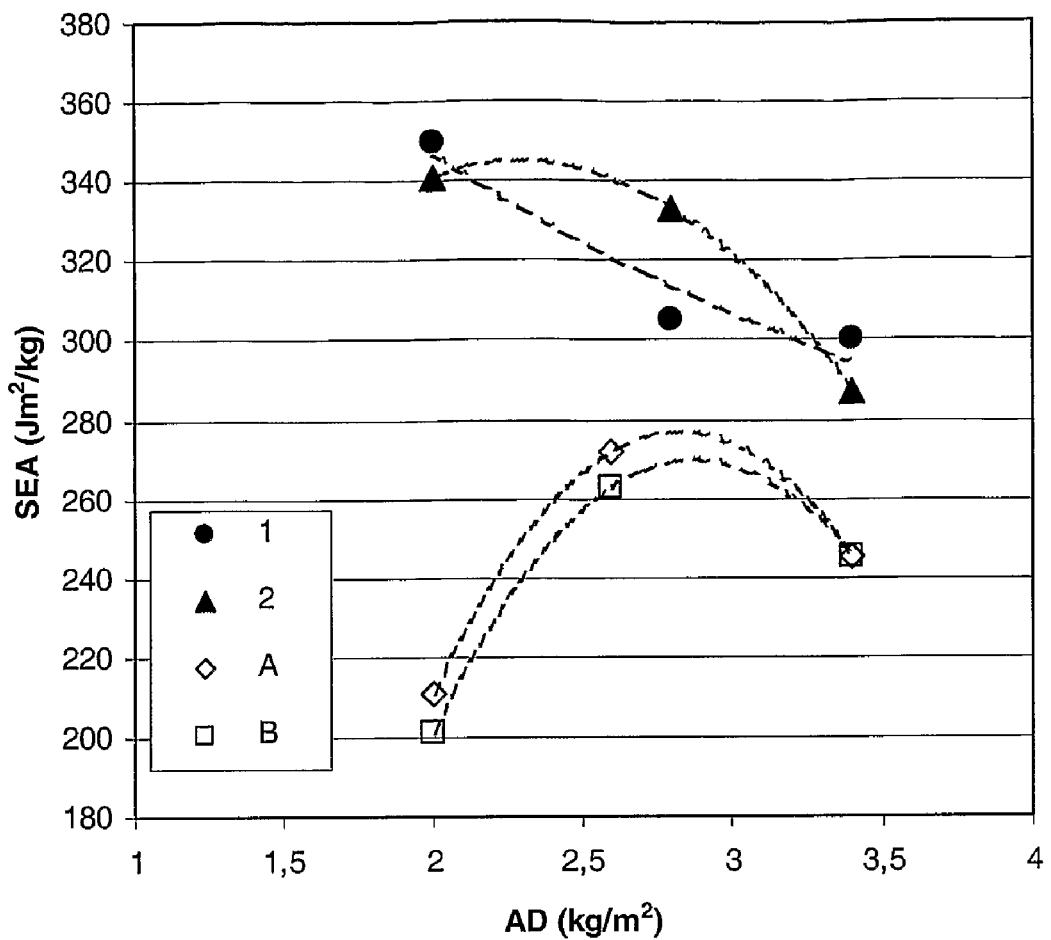

| | | | |
|---|---|---|---|
| 7,288,314 B2 * | 10/2007 | Jacobs et al. | 428/299.1 |
| 7,311,963 B2 * | 12/2007 | Mokveld et al. | 428/296.7 |
| 2005/0097647 A1 * | 5/2005 | Steeghs et al. | 2/2.5 |
| 2005/0215717 A1 * | 9/2005 | Dozeman | 525/192 |
| 2006/0051564 A1 * | 3/2006 | Jacobs et al. | 428/292.1 |
| 2007/0154707 A1 * | 7/2007 | Simmelink et al. | 428/364 |
| 2007/0164474 A1 * | 7/2007 | Jacobs et al. | 264/258 |

FOREIGN PATENT DOCUMENTS

| | | |
|---|---|---|
| EP | 0 805 332 A | 11/1997 |
| JP | 02006657 A * | 1/1990 |
| WO | WO 89/01125 | 2/1989 |
| WO | WO 9630436 A1 * | 10/1996 |
| WO | WO 9700353 A1 * | 1/1997 |
| WO | WO 97/49546 | 12/1997 |
| WO | WO 2004039565 A1 * | 5/2004 |
| WO | WO 2005066401 A1 * | 7/2005 |
| WO | WO 2005066577 A1 * | 7/2005 |

* cited by examiner

BALLISTIC-RESISTANT ARTICLE

This application is the U.S. national phase of international application PCT/NL2004/000028 filed 1 Jan. 2004 which designated the U.S., the entire content of which is hereby incorporated by reference.

The invention relates to a preformed sheet, to an assembly of at least two sheets and to a flexible ballistic-resistant article comprising said assembly. A preformed sheet comprises at least two mono-layers, each mono-layer containing unidirectionally oriented fibres having a tensile strength of at least about 1.2 GPa and a tensile modulus of at least 40 GPa, and a binder, with a fibre direction in each mono-layer being rotated with respect to the fibre direction in an adjacent mono-layer, and a separating film on both outer surfaces.

Such a preformed sheet is known from EP 0907504 A1. EP 0907504 A1 describes a composite layer (or preformed sheet), which was produced by cross-wise stacking of 4 monolayers and applying a separating film made from a linear low-density polyethylene, and subsequently consolidating the stack at elevated temperature under pressure. The monolayers containing unidirectionally oriented fibres were produced by aramid yarn fibres having a titer of 1680 dtex being guided from a bobbin frame over a comb and wetting them with an aqueous dispersion of a polystyrene-polyisoprene-polystyrene block copolymer as a binder or matrix material. Flexible ballistic-resistant shaped articles were made from a non-linked stack of several of said composite layers, the stack being stabilized by stitching at the corners.

A drawback of the preformed sheet known from the prior art is that the ratio between energy absorption of a ballistic-resistant article comprising said sheets, which is a measure for the ballistic protection level, and the weight of the ballistic resistant article is unfavourable. This ratio is generally expressed as the specific energy absorption (SEA), that is the energy absorbed per areal mass (generally called areal density (AD)). This implies that a relatively heavy ballistic-resistant article is required to achieve a certain desired protection level. If the ballistic-resistant article, on the other hand, has a low weight, the article provides a relatively low protection level against ballistic hits. For a large number of applications the lowest possible weight of the ballistic resistant-article in conjunction with a certain minimum protection level is of great importance. This is the case, for example, in the field of personal protection, such as clothing and body armour, like for example bullet-proof vests; but also for application in, for example, vehicles.

There is thus a constant need in industry for a preformed sheet that enables making of ballistic-resistant articles offering a higher protection level at a certain weight of the article.

According to the present invention, this is provided by a preformed sheet wherein the separating film has a porosity of between 40 and 90%.

With the preformed sheet according to the invention, a substantially higher protection level at a certain weight of an assembly of sheets or a ballistic-resistant article comprising an assembly of sheets according to the invention can be obtained. A further advantage of the preformed sheet according to the invention is that, in addition to having a favourable ratio between the protection level and the areal density, a ballistic-resistant article comprising an assembly of the preformed sheets offers more flexibility, which increases the scope for applications of such ballistic-resistant articles. This makes the article particularly suitable for applications where high flexibility and comfort-in-use is desirable, such as in body armour. The sheets further show improved printability with different techniques, which is an advantage in view of production and quality control and tracability issues.

With ballistic-resistant articles are meant shaped parts, comprising an assembly of at least two preformed sheets according to the invention, which can be used as, for example, protective clothing or for armouring of vehicles, and which offer protection against ballistic impacts such as by bullets and shrapnels.

An assembly according to the invention contains a stack of preformed sheets that are not linked to one another; that is, the sheets are not attached or adhered to each other over a substantial part of their adjacent surfaces. It is, however, difficult to handle a stack of preformed sheets that are not linked to one another, because such stack lacks any coherence required for further processing. To achieve some level coherence the ballistic-resistant article can, for example, be stitched through. Such stitching is done as little as possible, however, for example only at the corners or around the edges, in order to allow some movement of sheets relative to each other. Another possibility is to enclose the stack of preformed sheets in a flexible cover or envelop. Thus the preformed sheets in the assembly or in the ballistic resistant article remain able to shift with respect to one another, whereas the assembly or article in itself does have coherence and shows good flexibility.

A preformed sheet comprises at least two mono-layers of unidirectionally oriented fibres, with a fibre direction in each mono-layer being rotated with respect to the fibre direction in an adjacent mono-layer, and the at least two mono-layers being linked or attached to one another. The angle of rotation, which means the smallest angle enclosed by the fibres of the adjacent mono-layers, is between 0° and 90°. Preferably, the angle is between 45° and 90°. Most preferably, the angle is between 80° and 90°. Ballistic-resistant articles in which the fibres in the adjacent mono-layers are at such an angle to one another have better antiballistic characteristics. The term mono-layer refers to a layer of unidirectionally oriented fibres and a binder that basically holds the fibres together.

The term fibre comprises not only a monofilament but, inter alia, also a multifilament yarn or flat tapes. The term unidirectionally oriented fibres refers to fibres that, in one plane, are essentially oriented in parallel.

The fibres in the preformed sheet of the invention have a tensile strength of at least about 1.2 GPa and a tensile modulus of at least 40 GPa. The fibres may be inorganic or organic fibres. Suitable inorganic fibres are, for example, glass fibres, carbon fibres and ceramic fibres. Suitable organic fibres with such a high tensile strength are, for example, aramid fibres, liquid crystalline polymer fibres and fibres of, for example, polyolefins, polyvinyl alcohol, and polyacrylonitrile which are highly oriented, such as obtained, for example, by a gel spinning process. The fibres preferably have a tensile strength of at least about 2 GPa, at least 2.5 or even at least 3 GPa. Highly oriented polyolefin fibres are preferably used. The advantage of these fibres is that they have both a high tensile strength and a low specific weight, so that they are in particular very suitable for use in light weight ballistic-resistant articles.

Suitable polyolefins are in particular homopolymers and copolymers of ethylene and propylene, which may also contain small quantities of one or more other polymers, in particular other alkene-1-polymers.

Good results are obtained if linear polyethylene (PE) is selected as the polyolefin. Linear polyethylene is herein understood to mean polyethylene with less than 1 side chain per 100 C atoms, and preferably with fewer than 1 side chain per 300 C atoms; a side chain or branch generally containing at least 10 C atoms. The linear polyethylene may further contain up to 5 mol % of one or more other alkenes that are copolymerisable therewith, such as propene, butene, pentene, 4-methylpentene, octene.

Preferably, the linear polyethylene is of high molar mass; with an intrinsic viscosity (IV, as determined on solutions in decalin at 135° C.) is at least 4 dl/g; more preferably at least 8 dl/g. Such polyethylene is also referred to as ultra-high molar mass polyethylene (UHPE). Intrinsic viscosity is a measure for molar mass (also called molecular weight) that can more easily be determined than actual molar mass parameters like $M_n$ and $M_w$. There are several empirical relations between IV and $M_w$, but such relation is highly dependent on molar mass distribution. Based on the equation $M_w=5.37\times10^4$ $[IV]^{1.37}$ (see EP 0504954 A1) an IV of 4 or 8 dl/g would be equivalent to $M_w$ of about 360 or 930 kg/mol, respectively.

High performance polyethylene (HPPE) fibres consisting of polyethylene filaments that have been prepared by a gel spinning process, such as described, for example, in GB 2042414 A or WO 01/73173, are preferably used. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during or after the removal of the solvent.

The term binder refers to a material that binds or holds the fibres together and may enclose the fibres in their entirety or in part, such that the structure of the mono-layer is retained during handling and making of preformed sheets. The binder material can have been applied in various forms and ways; for example as a film, as a transverse bonding strip or as transverse fibres (transverse with respect to the unidirectional fibres), or by impregnating and/or embedding the fibres with a matrix material, e.g. with a polymer melt or a solution or dispersion of a polymeric material in a liquid. Preferably, matrix material is homogeneously distributed over the entire surface of the mono-layer, whereas a bonding strip or bonding fibres can be applied locally. Suitable binders are described in a.o. EP 0191306 B1, EP 1170925 A1, EP 0683374 B1 and EP 1144740 A1.

In a preferred embodiment, the binder is a polymeric matrix material, and may be a thermosetting material or a thermoplastic material, or mixtures of the two. The elongation at break of the matrix material is preferably greater than the elongation of the fibres. The binder preferably has an elongation of 3 to 500%. Suitable thermosetting and thermoplastic matrix materials are enumerated in, for example, WO 91/12136 A1 (pages 15-21). From the group of thermosetting polymers, vinyl esters, unsaturated polyesters, epoxides or phenol resins are preferably selected as matrix material. From the group of thermoplastic polymers, polyurethanes, polyvinyls, polyacrylics, polyolefins or thermoplastic elastomeric block copolymers such as polyisoprene-polyethylene-butylene-polystyrene or polystyrene-polyisoprene-polystyrene block copolymers can be selected as matrix material. Preferably the binder consists essentially of a thermoplastic elastomer, which preferably substantially coats the individual filaments of said fibres in a monolayer, and has a tensile modulus (determined in accordance with ASTM D638, at 25° C.) of less than about 40 MPa. Such a binder results in high flexibility of a mono-layer, and of an assembly of preformed sheets. It was found that very good results are obtained if the binder in the mono-layers and preformed sheet is a styrene-isoprene-styrene block copolymer.

In a special embodiment of the invention, the binder in the preformed sheet according to the invention also contains, in addition to the polymeric matrix material, a filler in an amount of from 5 to 80% by volume, calculated on the basis of the total volume of the binder. More preferably, the amount of filler is from 10 to 80% by volume and most preferably from 20 to 80% by volume. It was found that as a result, the flexibility of the ballistic resistant article increases without significant adverse effects on the antiballistic characteristics.

The fillers do not contribute to the bonding between the fibres, but rather serve for volumetric dilution of the matrix between the fibres, as a result of which the ballistic resistant article is more flexible and has higher energy absorption. The filler preferably comprises a finely dispersed substance having a low weight or density. The filler may be a gas, although using a gas as filler presents practical problems in processing the matrix material. The filler may also, inter alia, comprise the substances customary for preparing dispersions, such as emulsifiers, stabilizers, binders and the like or a finely dispersed powder.

It was found that if the binder contains an amount of filler below 80% by volume, the amount of binder is sufficient to achieve adequate bonding between the fibres, with a constant total quantity of matrix material. It was also found that if the matrix contains a quantity of filler greater than 5% by volume, the flexibility of the ballistic resistant article increases.

Preferably, the amount of binder in the mono-layer is at most 30 mass %, more preferably at most 25, 20, or even at most 15 mass %; since the fibres contribute most to ballistic performance.

The preformed sheet of the invention comprises separating films with a porosity of between 40 and 90% on both outer surfaces. Said films can be for example porous polyethylene, polypropylene or polytetrafluoroethylene films, the preparation of which is described in e.g. EP 0184392 A1 and EP 0504954 A1. Porosity of a film is the relative volume of the voids, pores or channels in the film (expressed in volume percentage), as determined from density measurements. Porosity of a film can be determined most conveniently before it is applied in the preformed sheet; porosity may also be reduced during laminating under pressure to form the preformed sheet. During lamination or pressure such conditions (temperature, pressure, time) are chosen, that a consolidated sheet is obtained; that is all layers at least partly adhering to each other, but without substantially melting the separating film as this would deteriorate porosity and mechanical properties of the film.

Preferably, the separating film has an initial porosity, that is before making the preformed sheet, of at least 50%, 60 or even at least 70%.

Preferably, the films are so-called micro-porous films, meaning that the pores and channels in the essentially continuous matrix structure have a size between about 0.001 and 10 micron, preferably between about 0.01 and 5 micron.

The separating film is a preferably made from a polyolefin, more preferably a polyethylene. There are many different polyethylene grades that are very suited for forming into thin films; including different types of copolymers of ethylene and at least one comonomer, like an alpha-olefin. In a preferred embodiment, the separating film is essentially made from a high molar mass polyethylene, more preferably form an ultra-high molar mass polyethylene (UHPE) of IV at least 4 dl/g. Such films show generally relatively high strength and modulus, and high abrasion resistance.

The preformed sheet can further comprise an adhesive layer between the porous film and other layers, in order to improve inter-layer adhesion, and thus consistency and stability of the sheet.

In a special embodiment of the invention, the preformed sheet contains mono-layers comprising HPPE fibres and a polyethylene porous film, more preferably a micro-porous UHPE film. The advantage of such construction is that good adhesion between the layers occurs without additional adhesives, thus contributing to weight reduction. The flexibility of an assembly comprising a stack of such sheets is furthermore very high, probably because of very low friction between the surfaces of the sheets. This greatly improves comfort to the wearer of protective articles made therefrom.

Preferably the separating film is a biaxially-stretched film, more preferably a 10 to 100× biaxially-stretched film. A 10 to 100× biaxially-stretched film is herein understood to be a film, which is stretched in two perpendicular directions such that the surface of the film increased by a factor 10 to 100. A method for the manufacturing of said stretched films is described in EP 0504954 A1. An advantage of biaxially-stretched films is that an even higher protection level at a certain weight can be obtained. Preferably, the film is at least 20× biaxially stretched, at least 30×, or even at least 40×. More preferably, biaxially-stretched films made from UHPE are applied in the sheets. Such films have relatively high tensile strength and modulus, which may contribute to deformation of the preformed sheet upon impact. Tensile properties are preferably expressed per width of film (e.g. in N/m) and not per cross-section (like $N/m^2$), to allow better comparison with non-porous films. Preferably, therefore, the separating film has a tensile strength per width of film (herein also called strength factor) of at least 150 N/m, at least 200, or even at least 250 N/m. In case of films with high elongation at break (for example greater than 20%) the yield strength is preferably taken as reference rather than strength at break. Tensile modulus per width of film is preferably at least 3000 N/m, at least 4000, or even at least 5000 N/m.

Although the thickness, or mass per surface area (called areal mass or areal density) of the film is not critical for ballistic performance, thin films are preferred, since this further contributes to making lightweight and flexible sheets, assemblies, and articles. The best results were obtained with a preformed sheet wherein the separating film has an areal density of between 2 and 8, preferably between 2 and 4 $g/m^2$.

The preformed sheet according to the invention comprises at least two mono-layers containing unidirectionally oriented fibres. In general, the preformed sheet comprises 2, 4 or another multiple of 2 perpendicularly oriented mono-layers. Preferably, the preformed sheet comprises two mono-layers of unidirectionally oriented fibers combined with a biaxially-stretched film. A preformed sheet with two mono-layers of unidirectionally oriented fibers combined with biaxially-stretched films on both outer surfaces turned out to give the best ballistic protection.

In a special embodiment of the invention, the preformed sheet contains as separating films uniaxially stretched films, preferably films with a stretch ratio of between 10 and 50. These uniaxially stretched films are placed such that the stretch direction of the film is perpendicular to the fibre direction in the adjacent layer of unidirectional fibres. In such case, the sheet may contain an uneven number of mono-layers. In a special embodiment, 3 mono-layers of unidirectional oriented fibres, a center layer of which can have up to about the same areal density as both adjacent mono-layers together, have been covered with uniaxially stretched films, with stretch direction perpendicular to the fibre direction in the adjacent layer of unidirectional fibres. The advantage of such construction is, that in a continuous process of making a sheet via e.g. calandering uniaxially stretched films onto a stack of monolayers, both separating films can be applied in the same direction from rolls of sheet.

The invention further relates to an assembly of at least two preformed sheets according to the invention, which sheets are not linked to one another. With increasing number of preformed sheets, the ballistic protection level is improved, but the weight of the assembly increases, and the flexibility decreases. In order to obtain a maximum flexibility, adjacent sheets in an assembly are not linked to one another. Depending on the threat, and the level of protection desired the skilled person can find an optimum in the number of sheets by some experimentation.

Further advantages of the ballistic-resistant assembly according to the invention, or article comprising such assembly, are found in applications in which, in addition to the weight and the protection level of the ballistic-resistant article, the flexibility plays an important part.

Ballistic-resistant assemblies and articles can be employed both in permanently and in once-only flexible applications. Permanently flexible applications refer to applications in which the ballistic-resistant articles as a result of the use continuously undergo adjustments in shape, such as, for example, ballistic-resistant articles for use as body armour. Once-only flexible applications refer to applications in which the ballistic-resistant assemblies or articles are brought into a specific shape only once. An example of this is a ballistic-resistant article that is to be fitted in not readily accessible spaces such as the inside of car doors.

It was found that a suitable flexibility, protection level and weight of the ballistic-resistant assembly is achieved if the weight of the preformed sheets has a particular maximum value. Preferably, the weight, or areal density of the preformed sheet in the ballistic-resistant articles in a permanently flexible application is at most 500 $g/m^2$, the fibre content of each mono-layer being between 10 and 150 $g/m^2$. More preferably, the weight of the preformed sheet is at most 300 $g/m^2$, the fibre content of each mono-layer being between 10 and 100 $g/m^2$.

Once-only flexible applications can make use of a ballistic-resistant assembly or article that contain preformed sheets having a weight or areal density of at most 800 $g/m^2$ and preferably greater than 300 $g/m^2$, because in this once-only flexible application a certain minimum stiffness is desired, so that the applied shape is retained. More preferably, the weight of the preformed sheets is greater than 400 $g/m^2$ and still more preferably greater than 500 $g/m^2$.

The ballistic-resistant assembly can, in principle, be fabricated by any known suitable method, for example in accordance with processes described in WO 95/00318, U.S. Pat. No. 4,623,574, or U.S. Pat. No. 5,175,040. A mono-layer is produced, for example, by fibres, preferably in the form of continuous multifilament yarns, being guided from a bobbin frame across a comb, as a result of which they are oriented in parallel in a plane. A temporary support layer, e.g. a coated paper sheet that is removed again from the mono-layer in a later stage of the process, may be used for easier processing. A binder is applied to basically hold the fibres together, that is to retain the fibre orientation and structure as obtained during further processing steps. If a matrix material is to be applied as binder, the fibres are preferably coated, before or after being oriented in parallel in a plane, with an amount of a liquid substance containing the binder or a precursor therefore, which in a later stage in the fabrication of the ballistic-resistant article reacts to give the polymer matrix material having the desired modulus of elasticity. The term precursor refers to a monomer, an oligomer or a cross-linkable polymer composition. The liquid substance may be a solution, a dispersion or a melt.

A number of mono-layers is laid with an angle of rotation, preferably at an angle of about 90°, on top of one another, and a separating film is placed on both surfaces (on top of and below the stacked mono-layers), a multi-layer sheet being formed in the process. Preferably, the temperature and/or the pressure is increased to consolidate the layers using known techniques; this can for example be done discontinuously by compressing a stack in a mould, or continuously via laminating and calandering steps. If a matrix material is applied as binder, the matrix material may thus be made to flow between the fibres and to adhere to the fibres of the under- and/or overlying mono-layers, and optionally to the separating film. If a solution or a dispersion of the matrix material is employed, the process of forming the mono-layers into a multi-layer sheet also comprises a step of evaporating the solvent or dispersant, generally before the steps of placing separating film layers and consolidation. Then the preformed sheets are stacked to produce an assembly, which in turn can be applied to make a ballistic-resistant article, with the option of stabilizing the assembly by for example local stitching or enveloping the stack with a flexible cover.

It was found that, with a view to obtaining a low binder content, especially a low matrix material content, it is advantageous to use a method in which the mono-layer is produced by wetting yarns having a count of yarn (or titer) of between 500 and 2500 dtex with a dispersion of the matrix material and optionally filler. Yarns having a count of yarn greater than 500 dtex absorb comparatively little matrix material from the dispersion. Preferably, the count is greater than 800 dtex, more preferably greater than 1000 dtex and most preferably greater than 1200 dtex. The count of yarn is preferably lower than 2500 dtex, because these yarns can be spread more readily in the plane of the mono-layer.

Preferably, an aqueous dispersion of a matrix material is used. An aqueous dispersion has a low viscosity, which has the advantage that the matrix material is very uniformly distributed over the fibres, and good, homogeneous fibre-fibre bonding being achieved as a result. A further advantage is that the dispersant water is non-toxic and can therefore be evaporated in the open air. Preferably, the dispersion, likewise with a view to obtaining a uniform distribution at the low matrix percentage aimed for, contains between 30 and 60 mass % of solid components (elastomeric matrix material and any filler present), relative to the total mass of the dispersion.

The ballistic-resistant assembly according to the invention, obtainable according to the methods described above, shows very good ballistic properties as expressed by $V_{50}$ and SEA values, especially at relatively low areal density. Preferably, the assembly according to the invention, or a flexible ballistic-resistant article comprising such assembly, has a specific energy absorption (SEA) of at least 300 $Jm^2/kg$, when struck by a bullet of type FMJ Parabellum 9×19 mm (8 grams). The energy absorption (EA) upon impact of a bullet or a shrapnel is calculated from the kinetic energy of a bullet or shrapnel of velocity $V_{50}$. The $V_{50}$ is the velocity at which the probability of the bullets or shrapnels penetrating through the ballistic structure is 50%.

The invention more specifically relates to a flexible ballistic-resistant article comprising an assembly of a plurality of sheets containing at least two mono-layers consisting essentially of HPPE multifilament yarn having a tensile strength of at least about 1.2 GPa and porous polyethylene separating films, the assembly having an areal density (AD) of at least 1.5 $kg/m^2$ and a specific energy absorption (SEA) of at least 280 $J·m^2/kg$ as measured against a 9×19 mm FMJ Parabellum bullet according to a test procedure based on Stanag 2920. Preferably, the article has a SEA of at least 300, 325, 350, or even at least 375 $J·m^2/kg$.

The invention is further explained by means of the following examples, without being limited thereto, however.

Methods

IV: the Intrinsic Viscosity is determined according to method PTC-179 (Hercules Inc. Rev. Apr. 29, 1982) at 135° C. in decalin, the dissolution time being 16 hours, with DBPC as anti-oxidant in an amount of 2 g/l solution, by extrapolating the viscosity as measured at different concentrations to zero concentration;

Side chains: the number of side chains in a UHPE sample is determined by FTIR on a 2 mm thick compression moulded film, by quantifying the absorption at 1375 cm−1 using a calibration curve based on NMR measurements (as in e.g. EP 0269151);

Tensile properties: tensile strength (or strength), tensile modulus (or modulus) and elongation at break (or eab) are defined and determined on multifilament yarns as specified in ASTM D885M, using a nominal gauge length of the fibre of 500 mm, a crosshead speed of 50%/min and Instron 2714 clamps, of type Fibre Grip D5618C. On the basis of the measured stress-strain curve the modulus is determined as the gradient between 0.3 and 1% strain. For calculation of the modulus and strength, the tensile forces measured are divided by the titre, as determined by weighing 10 meters of fibre; values in GPa are calculated assuming a density of 0.97 $g/cm^3$. Tensile properties of thin films were measured in accordance with ISO 1184(H).

Porosity of porous films was calculated from the measured density of the film and the density of the material from which the film was made (for UHPE a density of 0.97 $g/cm^3$ was used);

Ballistic performance: $V_{50}$ and SEA of composite panels were determined with a test procedure according to Stanag 2920, using 9 mm*19 mm FMJ Parabellum bullets (from Dynamit Nobel). An assembly of layers was fixed using flexible straps on a support filled with Roma Plastilin backing material, which was preconditioned at 35° C. Trauma effect was quantified by measuring the depth of back face deformation of the backing material.

Preparation of HPPE Fibres

A HPPE multifilament yarn was made by extruding an 8 mass % solution of a UHPE homopolymer having less than 0.3 side groups per 1000 per carbon atoms and an IV of 19.8 dl/g in decalin containing a ratio of cis/trans isomers of between 38/62 and 42/58, was made, and extruded with a 130 mm twin screw extruder equipped with a gear-pump at a temperature setting of 180° C. through spinplates having 1176 spinholes with a rate of 2.2 g/min per hole. The spinholes had an initial cylindrical channel of 3.5 mm diameter and L/D of 18, followed by a conical contraction with cone angle 60° into a cylindrical channel of 0.8 mm diameter and L/D of 10. The fluid filaments were cooled, after passing an air-gap of 25 mm, in a water bath kept at about 30-40° C. and with a water flow rate of about 5 cm/s perpendicular to the filaments entering the bath, and were taken-up at such rate that a draw ratio of 16 was applied to the as-spun filaments in the air-gap. The filaments were subsequently further drawn in the solid state in two steps; first in an oven with a temperature gradient of about 110-140° C., and than at about 151° C., applying a total solid state draw ratio of about 25, during which process the decalin evaporated from the filaments. The yarns thus obtained had a titer of 930 dtex, a tensile strength of 4.1 GPa and a modulus of 150 GPa.

COMPARATIVE EXPERIMENT A

A mono-layer was produced from the HPPE fibres described above, by guiding several yarns from a bobbin frame over a comb and wetting the filaments with an aqueous dispersion of Kraton® D1107 (polystyrene-polyisoprene-polystyrene block copolymer thermoplastic elastomer) as matrix material. The yarns were oriented in parallel in a plane, and after drying the areal density of the mono-layer was about 38 g/m², matrix content was about 12 mass %. A preformed sheet was produced by crosswise stacking 2 monolayers and applying as separating layers on each side a non-porous linear low-density polyethylene film with a thickness of 7 micron (equivalent to an areal density of about 7 g/m²), and consolidating the mono-layers and the separating films at a pressure of about 0.5 MPa and at a temperature of about 110-115° C. The polyethylene film had a strength at yield of about 10 MPa, or a strength factor of about 70 N/m.

A flat ballistic-resistant article was made from a loose, non-linked assembly of a number of preformed sheets, the assembly being stitched through at the corners. Ballistic performance for three different assemblies was tested with a bullet type 9×19 mm FMJ Parabellum (8 g); $V_{50}$, SEA and trauma (back face deformation) results are given in Table 1.

EXAMPLE 1

Comparative experiment A was repeated, but now a 20 micron thick micro-porous UHPE film, Solupor® 3P07A having a porosity 83% (obtained from DSM Solutech, NL), was applied as separating film. This biaxially stretched film had a tensile strength of about 12 MPa, elongation at break of 13% (both in machine direction), and strength factor of about 240 N/m. The assembled sheets easily slided over each other, emphasizing the need for some stabilization during further processing and testing. The flexibility of the stabilized assembly was judged as higher; the stack could more easily be bended than the stack of Comp. Exp. A. Surprisingly, observed $V_{50}$ values, and thus SEA, were markedly higher than for Comp. Exp. A; whereas trauma not increased.

COMPARATIVE EXPERIMENT B AND EXAMPLE 2

Comparative experiment A and example 1 were repeated, but the monolayers had AD of about 39 g/m² and matrix content was about 15 mass %. Test results confirm the improved ballistic performance of sheets made with porous separating layers, see Table 1.

COMPARATIVE EXPERIMENT C AND EXAMPLE 3

A unidirectional (UD) mono-layer was made as in Comp. Exp A with AD of about 20 g/m² and matrix content of about 15 mass %. A preformed sheet was made by placing 4 mono-layers cross-wise with a polyethylene film of 7 g/m² on both sides, and consolidating by compression at 110-115° C. A number of these sheets were stacked, stabilized with stitches, and tested on anti-ballistic performance as before.

In Example 3 the preformed sheet contained two microporous UHPE films of 8 micron (areal density 3 g/m²) and porosity 63% This developmental film was obtained from DSM Solutech, NL, and was similarly to the Solupor® 3P07A film made with a process as described in EP 0504954 A1). The assemblies made herefrom show significantly better ballistic performance than the samples with non-porous films, see Table 1.

The improved performance is further exemplified by FIG. 1, wherein observed SEA values are plotted versus areal density of the tested assemblies of experiments A, B, 1 and 2.

TABLE 1

| Experiment | Preformed sheet Number of mono-layers | Assembly of sheets Number of sheets | AD (kg/m²) | Ballistic results $V_{50}$ (m/s) | SEA (J·m²/kg) | trauma (mm) |
|---|---|---|---|---|---|---|
| Comp. Exp. A | 2 | 22 | 2 | 322 | 211 | 37 |
|  |  | 31 | 2.6 | 435 | 272 | 48 |
|  |  | 38 | 3.4 | 466 | 245 | 34 |
| Example 1 | 2 | 24 | 2 | 417 | 350 | 44 |
|  |  | 34 | 2.8 | 464 | 305 | 40 |
|  |  | 41 | 3.4 | 506 | 300 | 35 |
| Comp. Exp. B | 2 | 21 | 2 | 333 | 201 | 37 |
|  |  | 29 | 2.6 | 426 | 263 | 39 |
|  |  | 36 | 3.4 | 458 | 245 | 34 |
| Example 2 | 2 | 23 | 2 | 409 | 341 | 40 |
|  |  | 33 | 2.8 | 484 | 333 | 38 |
|  |  | 40 | 3.4 | 495 | 287 | 33 |
| Comp. Exp. C | 4 | 21 | 2 | 425 | 365 | 35 |
|  |  | 30 | 2.8 | 466 | 307 | 35 |
|  |  | 36 | 3.4 | 489 | 280 | 35 |
| Example 3 | 4 | 23 | 2 | 462 | 429 | 36 |
|  |  | 32 | 2.8 | 494 | 352 | 30 |
|  |  | 39 | 3.4 | 528 | 329 | 32 |

The invention claimed is:

1. Preformed sheet comprising at least two mono-layers, each mono-layer containing unidirectionally oriented fibers having a tensile strength of at least about 1.2 GPa and a tensile modulus of at least 40 GPa, and a binder, with a fibre direction in each mono-layer being rotated with respect to the fibre direction in an adjacent mono-layer, and a non-fibrous separating film on both outer surfaces, wherein the separating film has a porosity of between 40 and 90%.

2. Preformed sheet according to claim 1, wherein the fibres comprise high-performance polyethylene fibres.

3. Preformed sheet according to claim 1, wherein the binder consists essentially of a thermoplastic elastomer and has a tensile modulus of less than about 40 MPa.

4. Preformed sheet according to claim 1, wherein the separating film is made from ultra-high molar mass polyethylene.

5. Preformed sheet according to claim 1, wherein the separating film is a biaxially stretched film.

6. Preformed sheet according to claim 1, wherein the separating film has an areal density of between 2 and 4 G/M².

7. A preformed sheet according to claim 1, wherein the separating film has a strength factor of at least 150 N/m.

8. A preformed sheet according to claim 1, comprising two mono-layers of unidirectionally oriented fibres.

9. Assembly of at least two sheets which are not linked to one another, wherein each of the at least two sheets comprises at least two mono-layers, each mono-layer containing unidirectionally oriented fibers having a tensile strength of at least about 1.2 GPa and a tensile modulus of at least 40 GPa, and a binder, with a fibre direction in each mono-layer being rotated with respect to the fibre direction in an adjacent mono-layer, and a non-fibrous separating film on both outer surfaces, wherein the separating film has a porosity of between 40 and 90%.

10. Flexible ballistic-resistant article comprising at least one assembly comprised of at least two sheets which are not linked to one another, wherein each sheet comprises at least two mono-layers, each mono-layer containing unidirectionally oriented fibers having a tensile strength of at least about 1.2 GPa and a tensile modulus of at least 40 GPa, and a binder, with a fibre direction in each mono-layer being rotated with respect to the fibre direction in an adjacent mono-layer, and a non-fibrous separating film on both outer surfaces, wherein the separating film has a porosity of between 40 and 90%.

11. Flexible ballistic-resistant article comprising an assembly, which contains a plurality of sheets containing at least two mono-layers, each mono-layer consisting essentially of unidirectionally oriented high-performance polyethylene fibres having a tensile strength of at least 1.2 GPa, with the fibre direction in each mono-layer being rotated with respect to the fibre direction in an adjacent mono-layer, and two non-fibrous polyethylene separating films having a porosity of between 40 and 90% on both outer surfaces, the assembly having an areal density of at least 1.5 kg/m$^2$ and a specific energy absorption of at least 300 J$\cdot^2$/kg as measured against a 9×19 mm FMJ Parabellum buliet according to a test procedure based on Stanag 2920.

* * * * *